No. 637,748. Patented Nov. 21, 1899.
J. C. ERNEST.
CAR BRAKE.
(Application filed May 25, 1899.)
(No Model.)
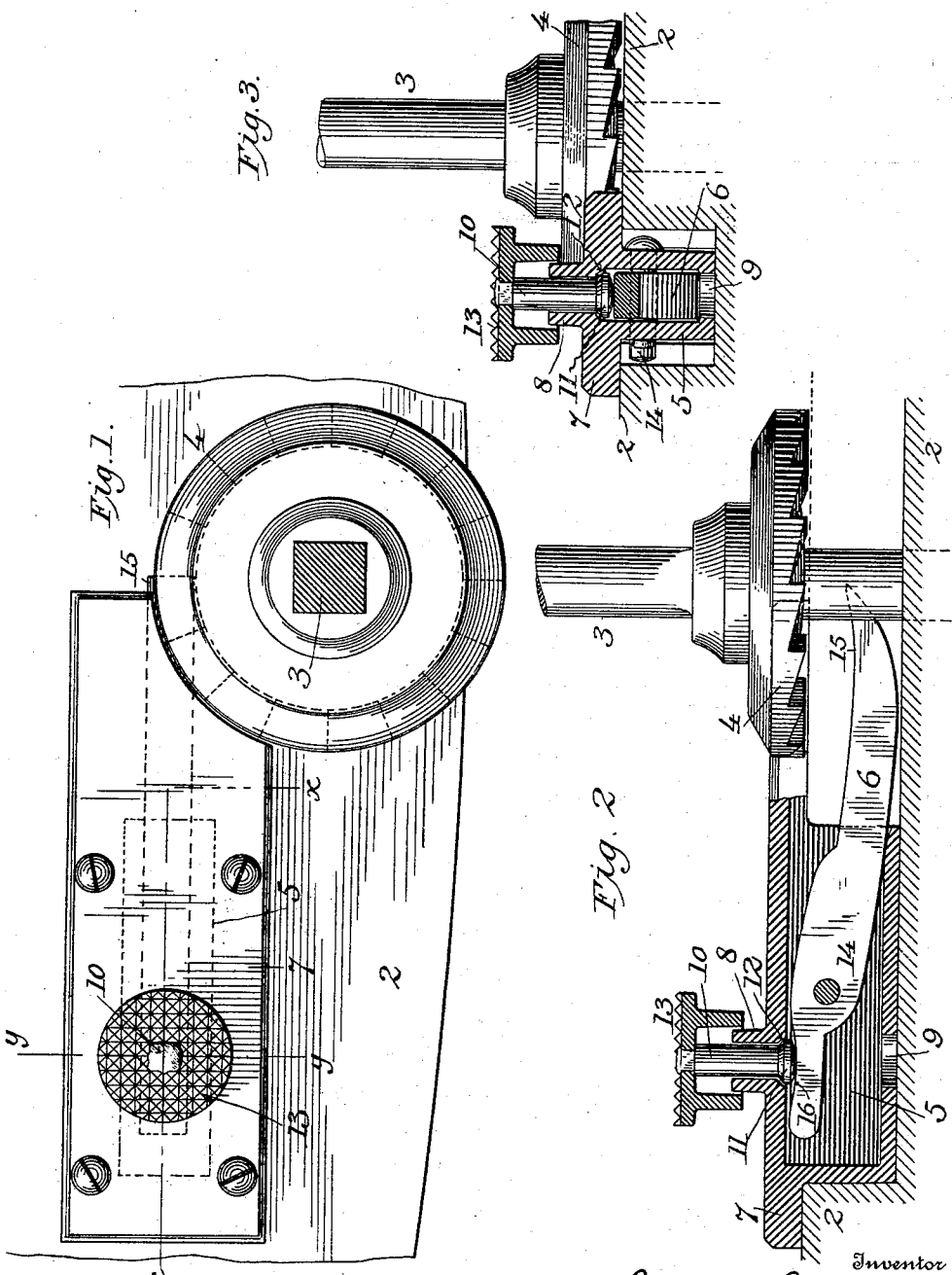
Witnesses
Sidney P. Hollingsworth
Marie L. Spellman
Inventor
John C. Ernest
by W. A. Pierious Attorney
THE NORRIS PETERS CO., PHOTO-LITHO., WASHINGTON, D. C.

UNITED STATES PATENT OFFICE.

JOHN C. ERNEST, OF HARRISBURG, PENNSYLVANIA, ASSIGNOR OF ONE-HALF TO JOHN B. FOLTZ, OF SAME PLACE.

CAR-BRAKE.

SPECIFICATION forming part of Letters Patent No. 637,748, dated November 21, 1899.

Application filed May 25, 1899. Serial No. 718,285. (No model.)

*To all whom it may concern:*

Be it known that I, JOHN C. ERNEST, a citizen of the United States, residing at Harrisburg, in the county of Dauphin and State of Pennsylvania, have invented certain new and useful Improvements in Car-Brakes; and I do declare the following to be a full, clear, and exact description of the invention, such as will enable others skilled in the art to which it appertains to make and use the same.

This invention relates to car-brakes; and it has for its object to provide a simple, durable, and inexpensive foot-operated device for locking the brake-staff of car-brakes and one which will prevent the clogging thereof by ice, snow, or dirt, and while it is well adapted for use on railway-cars generally it is particularly adapted for use on electric street-cars, where it is desirable that the motorman have the free use of his hands to operate the gong, motor, and brake-staff; and it consists in the parts and combinations of parts hereinafter described and claimed.

In the accompanying drawings, forming a part of this specification, Figure 1 is a plan view of my improved device. Fig. 2 is a longitudinal vertical section on the line X X, Fig. 1; and Fig. 3, a vertical transverse section on the line Y Y, Fig. 1.

Similar numerals refer to similar parts throughout all the views.

Referring to the drawings, the numeral 2 represents the platform of a car, and 3 a brake-staff passing therethrough or an eye bolted to the platform in the usual or any desired manner. To the brake-staff is secured in any desired manner a crown-wheel 4, the face of which stands above the surface of the platform, so that it may readily turn with the staff. In a mortised recess formed in the platform 2 is located the case or box 5 for the dog 6, said box being cast in one piece and cored out and formed with the lateral flange 7, through which it is bolted or secured by screws to the platform, and with the collar 8 on its upper face, as shown. The box or case is open at one end for the insertion of the dog 6 therein and is formed with an opening 9 in its bottom plate for the insertion of the pin 10, which extends through the perforation in the collar 8 and is formed with a beveled head 11, adapted to fit in the recess 12, formed in the lower or under surface of the top plate of the box, so as to permit of the use of a comparatively thick head on the pin. To the end of the pin is secured an annular cap 13, adapted to fit over the collar 8 and having its upper surface serrated or roughened. The dog 6 is pivotally mounted or hung on a pin 14, passing through the perforations formed therefor in the side walls of the box or case 5, and the front end or portion 15 of said dog is curved and tapered to form a broad tooth adapted to engage the teeth of the crown-wheel, while the rear end is slightly dished on its upper surface, as at 16, where the pin 10 bears thereon.

The top plate of the box at one end is elongated and a corner thereof is cut out on the arc of a circle, so that the edge or periphery of the crown-wheel may be fitted nicely thereagainst, as shown. Thus it will be noticed that all dirt, snow, water, and ice are excluded from the box, and that, therefore, there can be no liability of interference with the operation of the device from these causes.

As will be observed, the weight of the dog serves to raise the pin 10 and its cap and to normally hold the same in their raised positions and that the dog is normally disengaged from the crown-wheel. When the brake is to be applied, the foot of the operator is applied to the cap, thereby forcing down the pin 10 and raising the free end of the dog into engagement with the crown-wheel, the teeth of which slip over the same during its rotation until the desired or necessary pressure is applied to the wheel or track, as the case may be, by the brake, when the dog will engage a tooth of the wheel and hold the brake. To release the brake merely requires a slight turn of the brake-staff, when the dog will drop out of engagement with the wheel and permit the staff to be revolved in the opposite direction.

Having thus described my invention, what I claim as new, and desire to secure by Letters Patent, is—

1. A car-brake-staff locking device comprising a box or casing having an open end, a dog pivoted near one end in said box or casing and having its other end projecting therefrom, a pin guided in an opening in said box and engaging the inner end of the dog, and a crown-wheel secured to the brake-staff and arranged in position to be engaged by the outer end of said dog when said pin is actuated.

2. A car-brake-staff locking device comprising a box or casing arranged in a recess of the car-platform, said box or casing being formed with a vertical opening and a collar surrounding said opening, a dog pivoted at one end in said box or casing, a pin loosely inserted in said opening and engaging the inner end of said dog, a cap secured to the pin and fitting over the collar, and a crown-wheel secured to the brake-staff and arranged in position to be engaged by the outer end of said dog.

In testimony whereof I affix my signature in presence of two witnesses.

JOHN C. ERNEST.

Witnesses:
EMERY DULL,
W. H. ROMIG.